US012784476B2

(12) United States Patent
Feng et al.

(10) Patent No.: US 12,784,476 B2
(45) Date of Patent: Nov. 3, 2026

(54) MODELING METHOD FOR PICKING TARGET OF FRUIT BUNCH PICKING ROBOT

(71) Applicant: Research Center of Intelligent Equipment, BAAFS, Beijing (CN)

(72) Inventors: Qingchun Feng, Beijing (CN); Yajun Li, Beijing (CN); Chuanlang Peng, Beijing (CN); Yifan Zhang, Beijing (CN)

(73) Assignee: Research Center of Intelligent Equipment, BAAFS, Beijing (CN)

( * ) Notice: Subject to any disclaimer, the term of this patent is extended or adjusted under 35 U.S.C. 154(b) by 214 days.

(21) Appl. No.: 18/757,863

(22) Filed: Jun. 28, 2024

(65) Prior Publication Data

US 2025/0095389 A1 Mar. 20, 2025

(30) Foreign Application Priority Data

Sep. 19, 2023 (CN) ........................ 202311205328.2

(51) Int. Cl.

| | |
|---|---|
| ***G06V 20/68*** | (2022.01) |
| ***B25J 9/16*** | (2006.01) |
| ***G06V 10/26*** | (2022.01) |
| ***G06V 10/42*** | (2022.01) |
| ***G06V 10/44*** | (2022.01) |
| ***G06V 10/764*** | (2022.01) |

(Continued)

(52) U.S. Cl.

CPC .............. *G06V 20/68* (2022.01); *B25J 9/163* (2013.01); *G06V 10/26* (2022.01); *G06V 10/42* (2022.01); *G06V 10/457* (2022.01); *G06V 10/766* (2022.01); *G06V 10/774* (2022.01); *G06V 10/82* (2022.01); *G06V 10/764* (2022.01); *G06V 2201/07* (2022.01)

(58) Field of Classification Search

CPC ...... G06V 20/68; G06V 10/457; G06V 10/42; G06V 10/82; G06V 10/26; G06V 10/774; G06V 10/764; G06V 2201/07; G06V 10/766; B25J 9/163

See application file for complete search history.

(56) References Cited

U.S. PATENT DOCUMENTS

| | | | | |
|---|---|---|---|---|
| 12,558,712 | B1 * | 2/2026 | Morgan ................ | B07C 5/3422 |
| 2019/0087726 | A1 * | 3/2019 | Greenblatt ............ | G06V 10/82 |

(Continued)

*Primary Examiner* — Pinalben Patel

(74) *Attorney, Agent, or Firm* — Millen, White, Zelano & Branigan P.C.; William F. Nixon

(57) ABSTRACT

Disclosed is a modeling method for a picking target of a fruit bunch picking robot, which relates to the technical field of general image data processing or generation. The modeling method includes: obtaining an image of a to-be-picked region of a picking robot, and extracting image features of each branch and fruit cluster in the image of the to-be-picked region through a multi-task perception network; determining a to-be-picked fruit cluster based on the image feature of the fruit cluster; inputting the image features of the branch and the fruit cluster into a subordinate decision model to determine a branch connected to the to-be-picked fruit cluster; and extracting key points of image features of the to-be-picked fruit cluster and the branch connected to the to-be-picked fruit cluster, and modeling the to-be-picked fruit cluster and the branch connected to the to-be-picked fruit cluster.

8 Claims, 10 Drawing Sheets

(51) Int. Cl.

| | |
|---|---|
| ***G06V 10/766*** | (2022.01) |
| ***G06V 10/774*** | (2022.01) |
| ***G06V 10/82*** | (2022.01) |

(56) References Cited

U.S. PATENT DOCUMENTS

2021/0000013 A1* 1/2021 Robertson ............ B25J 15/0019
2021/0056307 A1* 2/2021 Li ........................ G06V 10/764

* cited by examiner

MODELING METHOD FOR PICKING TARGET OF FRUIT BUNCH PICKING ROBOT

CROSS REFERENCE TO RELATED APPLICATION

This patent application claims the benefit and priority of Chinese Patent Application No. 2023112053282, filed with the China National Intellectual Property Administration on Sep. 19, 2023, the disclosure of which is incorporated by reference herein in its entirety as part of the present application.

TECHNICAL FIELD

The present disclosure relates to the technical field of general image data processing or generation, and in particular, to a modeling method for a picking target of a fruit bunch picking robot.

BACKGROUND

In recent years, with increasing commercialization and industrialization of tomatoes, crop cultivation in a large-scale tomato planting base and facility has achieved substantial development. Pure manual harvesting is no longer sufficient to meet a need of large-scale commercial production. Although robot picking is considered an effective solution to alleviate increasing labor intensity, a complex agricultural environment and changeability in a posture and a shape of a tomato fruit bunch pose serious challenges to a visual system and an operation of a picking robot.

For soft-skinned and long-stemmed fruits such as tomatoes, strawberries, and sweet peppers, it is necessary to simultaneously obtain spatial posture information of the fruit and a branch connected to the fruit to guide a robotic arm to separate the fruit from the branch.

In actual picking, a visual image obtained by the robot often contains more than one tomato plant. These tomato plants are sheltered from each other, are in a shape of a long strip, and have similar colors. The robot often cannot recognize a corresponding branch of a current to-be-picked plant, resulting in a picking failure.

SUMMARY

The present disclosure provides a modeling method for a picking target of a fruit bunch picking robot, to solve a prior-art problem of a picking failure because a robot recognizes an incorrect branch during fruit bunch picking.

The present disclosure provides a modeling method for a picking target of a fruit bunch picking robot, where a fruit bunch includes a branch and a fruit cluster connected to the branch, and the modeling method for a picking target of a fruit bunch picking robot includes:

obtaining an image of a to-be-picked region of a picking robot, and extracting image features of each branch and fruit cluster in the image of the to-be-picked region through a multi-task perception network;

determining a to-be-picked fruit cluster based on the image feature of the fruit cluster; and inputting the image features of the branch and the fruit cluster into a subordinate decision model to determine a branch connected to the to-be-picked fruit cluster; and extracting key points of image features of the to-be-picked fruit cluster and the branch connected to the to-be-picked fruit cluster, and modeling the to-be-picked fruit cluster and the branch connected to the to-be-picked fruit cluster.

According to the modeling method for a picking target of a fruit bunch picking robot in the present disclosure, the extracting image features of each branch and fruit cluster in the image of the to-be-picked region through a multi-task perception network includes:

extracting an overall image feature of the fruit bunch; and extracting a boundary frame of the fruit cluster and a segmentation mask of the branch based on the overall image feature of the fruit bunch.

According to the modeling method for a picking target of a fruit bunch picking robot in the present disclosure, the multi-task perception network includes:

a shared encoder configured to extract the overall image feature of the fruit bunch;

a target detection decoder communicatively connected to the shared encoder and configured to process the overall image feature of the fruit bunch to extract the boundary frame of the fruit cluster; and an instance segmentation decoder communicatively connected to the shared encoder and configured to process the overall image feature of the fruit bunch to extract the segmentation mask of the branch.

According to the modeling method for a picking target of a fruit bunch picking robot in the present disclosure, before the obtaining an image of a to-be-picked region of a picking robot, and extracting image features of each branch and fruit cluster in the image of the to-be-picked region through a multi-task perception network, the modeling method for a picking target of a fruit bunch picking robot includes:

collecting an image sample of the fruit bunch;

determining a subordinate relationship parameter based on the image sample of the fruit bunch; and training a classification and regression tree model based on the subordinate relationship parameter of the image sample of the fruit bunch, and constructing the subordinate decision model.

According to the modeling method for a picking target of a fruit bunch picking robot in the present disclosure, the branch includes a main stem and a fruit stem, the main stem and the fruit cluster are respectively connected to two ends of the fruit stem, and the subordinate relationship parameter includes a first parameter, a second parameter, a third parameter, a fourth parameter, and a fifth parameter; and the determining a subordinate relationship parameter based on the image sample of the fruit bunch includes:

determining the first parameter based on a connection relationship between the fruit cluster and the fruit stem in the image sample;

determining the second parameter based on a connection relationship between the fruit stem and the main stem in the image sample;

determining the third parameter based on a positional relationship between the fruit cluster and the fruit stem in the image sample;

determining the fourth parameter based on a positional relationship between a lower endpoint of the fruit stem and the fruit cluster in the image sample; and determining the fifth parameter based on a distance between an upper endpoint of the fruit stem and a center line of the main stem in the image sample.

According to the modeling method for a picking target of a fruit bunch picking robot in the present disclosure, the inputting the image features of the branch and the fruit cluster into a subordinate decision model to determine a branch connected to the to-be-picked fruit cluster includes:

determining the subordinate relationship parameter based on the image features of the branch and the fruit cluster; and inputting the subordinate relationship parameter into the subordinate decision model to determine a branch connected to each fruit cluster, so as to determine the branch connected to the to-be-picked fruit cluster.

According to the modeling method for a picking target of a fruit bunch picking robot in the present disclosure, the branch includes a main stem and a fruit stem, the main stem and the fruit cluster are respectively connected to two ends of the fruit stem, and the key points include a key point of the fruit cluster, a key point of the fruit stem, and a key point of the main stem; and the extracting key points of image features of the to-be-picked fruit cluster and the branch connected to the to-be-picked fruit cluster, and modeling the to-be-picked fruit cluster and the branch connected to the to-be-picked fruit cluster includes:

extracting a key point that is of the fruit cluster and located in the boundary frame of the fruit cluster, and constructing a fruit cluster model;

extracting a key point that is of the fruit stem and located within a segmentation mask of the fruit stem, and constructing a fruit stem model; and extracting a key point that is of the main stem and located within a segmentation mask of the main stem, and constructing a main stem model.

According to the modeling method for a picking target of a fruit bunch picking robot in the present disclosure, the key point of the fruit cluster includes all vertices of the boundary frame of the fruit cluster.

According to the modeling method for a picking target of a fruit bunch picking robot in the present disclosure, the key point of the fruit stem includes a connection point between the fruit stem and the main stem, a connection point between the fruit stem and the fruit cluster, and an inflection point of a middle segment of the fruit stem.

According to the modeling method for a picking target of a fruit bunch picking robot in the present disclosure, the key point of the main stem includes a first key point and a plurality of second key points, the first key point is a connection point between the fruit stem and the main stem, and the second key points are spaced on both sides of the first key point along an extension direction of the main stem.

According to the modeling method for a picking target of a fruit bunch picking robot in the present disclosure, the image of the to-be-picked region is processed through the multi-task perception network. The multi-task perception network can process a plurality of tasks in parallel, and simultaneously extract the image features of the branch and the fruit cluster, thereby achieving a higher processing efficiency. A subordinate connection relationship between the fruit cluster and the branch is determined by using the subordinate decision model based on the image features of the fruit cluster and the branch, and a branch that does not belong to a picking target is filtered out to determine the to-be-picked fruit cluster and the branch connected to the to-be-picked fruit cluster, such that the picking target is determined more accurately. This effectively solves a prior-art problem of a picking failure because a robot recognizes an incorrect branch during fruit bunch picking.

BRIEF DESCRIPTION OF THE DRAWINGS

To describe the technical solutions in the present disclosure or in the prior art more clearly, the following briefly describes the accompanying drawings required for describing the embodiments or the prior art. Apparently, the accompanying drawings in the following description show some embodiments of the present disclosure, and a person skilled in the art may still derive other accompanying drawings from these accompanying drawings without creative efforts.

REFERENCE NUMERALS

1: fruit bunch;
11: branch; 12: fruit cluster;
111: main stem; 112: fruit stem;
910: multi-task perception module; 920: subordinate decision module; 930: modeling module;
1010: processor; 1020: communications interface; 1030: memory; 1040: communications bus.

DETAILED DESCRIPTION OF THE EMBODIMENTS

To make the objectives, technical solutions and advantages of the present disclosure clearer, the following clearly and completely describes the technical solutions in the present disclosure with reference to the accompanying drawings in the present disclosure. Apparently, the described embodiments are some but not all of the embodiments of the present disclosure. All other embodiments obtained by those of ordinary skill in the art based on the embodiments of the present disclosure without creative efforts should fall within the protection scope of the present disclosure.

A modeling method for a picking target of a fruit bunch picking robot provided in the present disclosure is described below with reference to FIG. 1 to FIG. 3.

Figure 1:
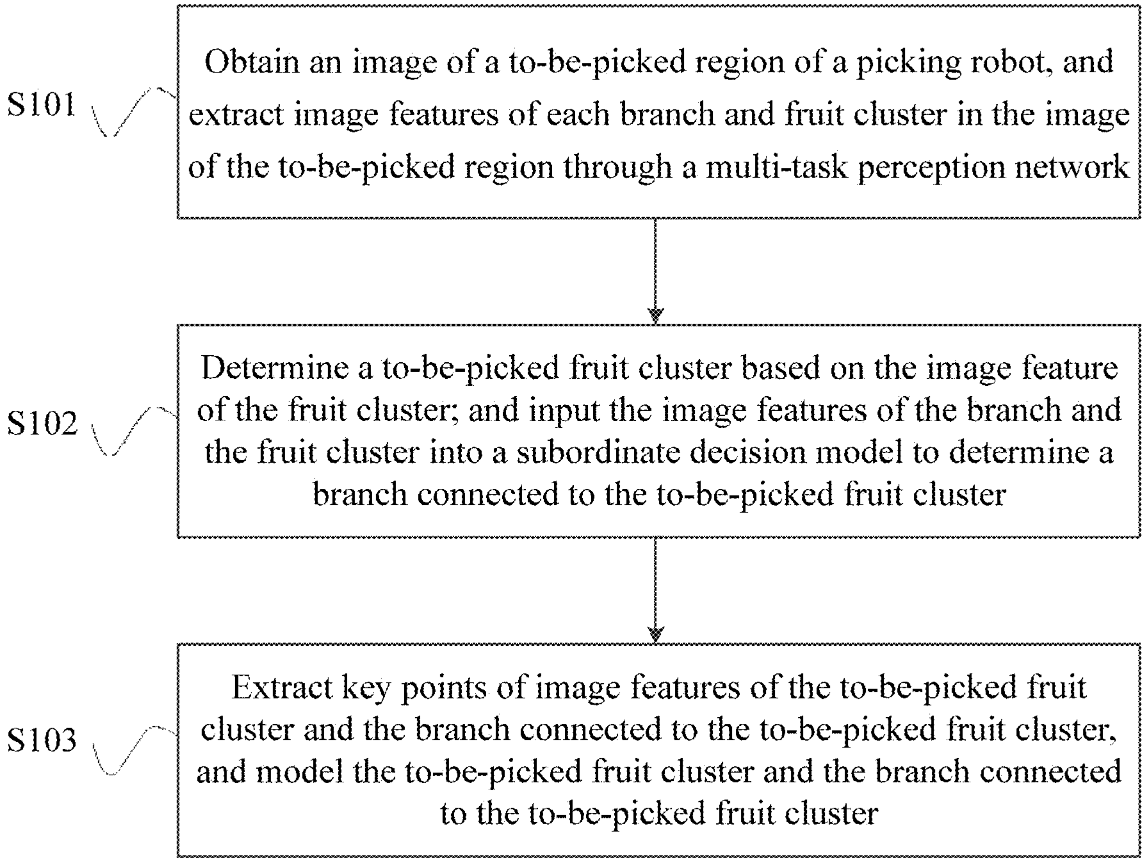
FIG. 1 is a first flowchart of a modeling method for a picking target of a fruit bunch picking robot according to an embodiment of the present disclosure.
Figure 2:
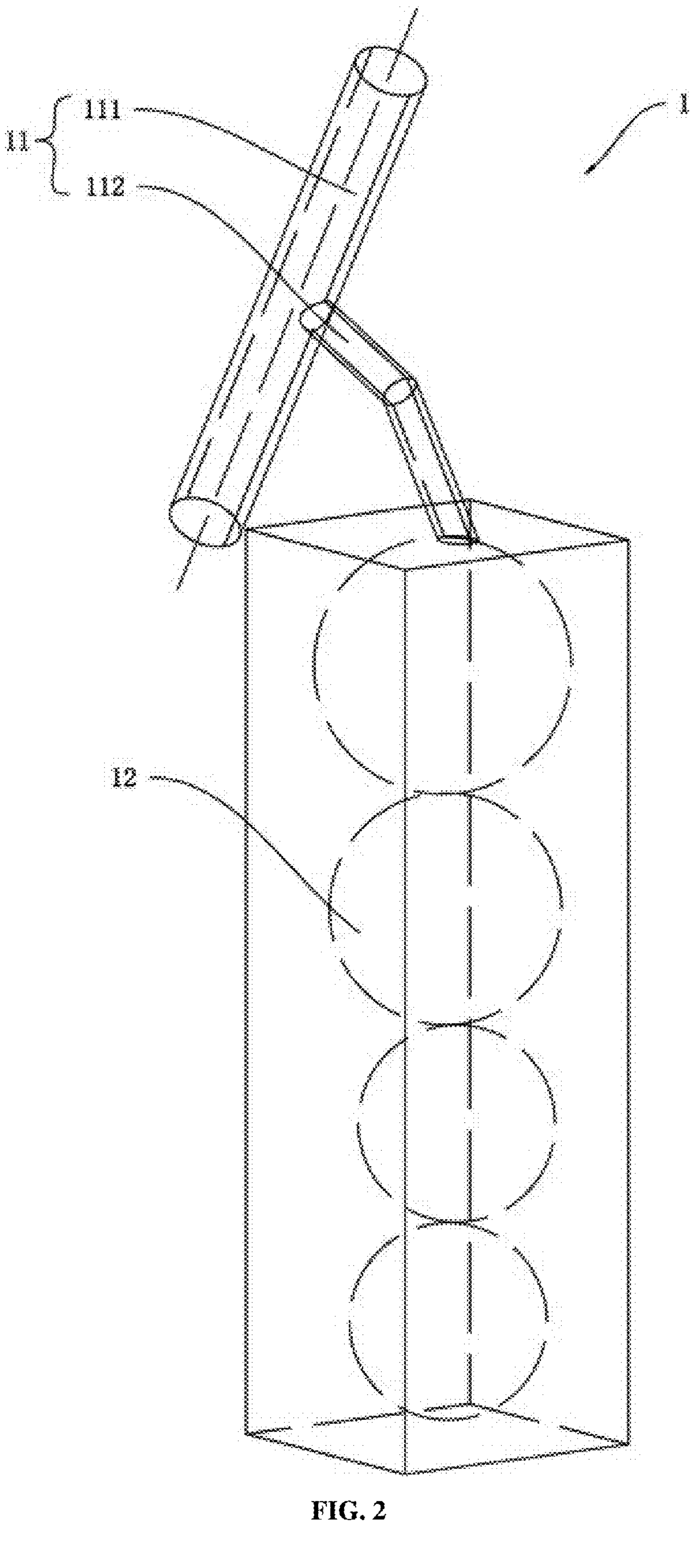
FIG. 2 is a first schematic diagram of a fruit bunch according to an embodiment of the present disclosure.
Figure 3:
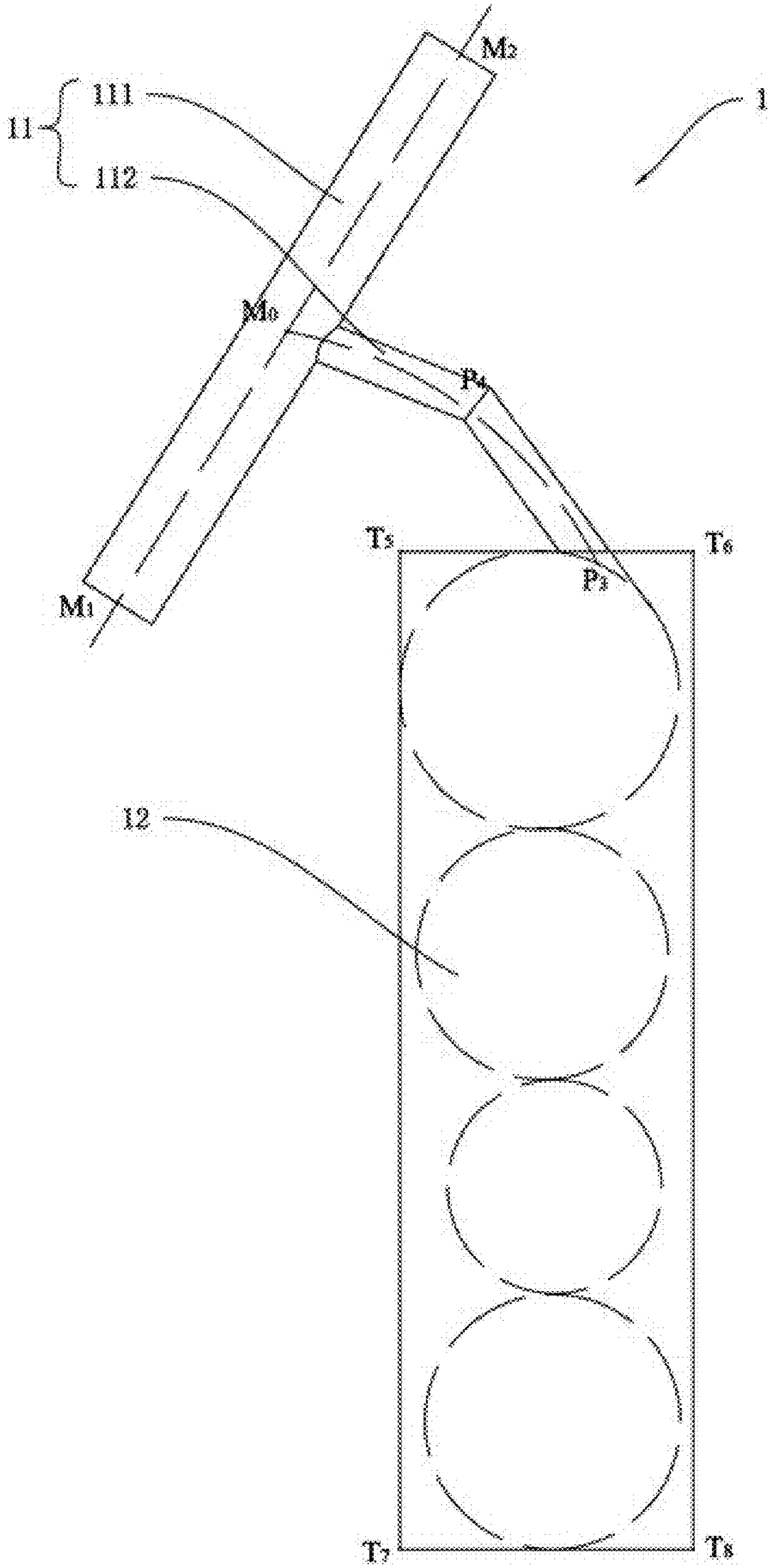
FIG. 3 is a second schematic diagram of a fruit bunch according to an embodiment of the present disclosure.

As shown in FIG. 1 to FIG. 3, in the modeling method for a picking target of a fruit bunch picking robot in the present disclosure, a fruit bunch 1 includes a branch 11 and a fruit cluster 12 connected to the branch 11. The modeling method for a picking target of a fruit bunch picking robot includes following steps:

Step S101: Obtain an image of a to-be-picked region of a picking robot, and extract image features of each branch and fruit cluster in the image of the to-be-picked region through a multi-task perception network.

Step S102: Determine a to-be-picked fruit cluster based on the image feature of the fruit cluster; and input the image features of the branch and the fruit cluster into a subordinate decision model to determine a branch connected to the to-be-picked fruit cluster.

Step S103: Extract key points of image features of the to-be-picked fruit cluster and the branch connected to the to-be-picked fruit cluster, and model the to-be-picked fruit cluster and the branch connected to the to-be-picked fruit cluster.

In this embodiment, the image of the to-be-picked region in front of the picking robot is first obtained through a camera, a sensor, or another device. The image of the to-be-picked region is processed and recognized through the multi-task perception network, such that each branch 11 and each fruit cluster 12 in the image are recognized and segmented, and the image features (such as contour shapes and positions) of each branch 11 and each fruit cluster 12 are extracted for further recognition and processing.

After the image features of each branch 11 and each fruit cluster 12 are obtained, the to-be-picked fruit cluster 12 is selected from the fruit clusters 12 based on the image feature of the fruit cluster 12. Specifically, a distance between each fruit cluster 12 and the picking robot can be determined based on the image feature of the fruit cluster 12. Typically, a fruit cluster 12 closest to the picking robot is identified as the to-be-picked fruit cluster 12. Next, the image features of each branch 11 and each fruit cluster 12 are input into the subordinate decision model. A subordinate connection relationship between each branch 11 and each fruit cluster 12 is determined by using the subordinate decision model, to determine the branch 11 connected to the to-be-picked fruit cluster 12. This facilitates subsequent modeling.

After the to-be-picked fruit cluster 12 and the branch 11 connected to the to-be-picked fruit cluster 12 are determined, the key points of the image features of the to-be-picked fruit cluster 12 and the branch 11 connected to the to-be-picked fruit cluster 12 are extracted. These key points can be used to characterize appearance information (such as a shape, a size, and an extension direction) and position information of the to-be-picked fruit cluster 12 and the branch 11 connected to the to-be-picked fruit cluster 12. The to-be-picked fruit cluster 12 and the branch 11 connected to the to-be-picked fruit cluster 12 are modeled based on these key points, such that a key appearance feature of the to-be-picked fruit bunch 1 can be simulated to ensure a simulation effect of the model. In addition, the modeling based on the key points can also filter out an unnecessary detail, simplify the model, and improve modeling efficiency.

According to the modeling method for a picking target of a fruit bunch picking robot in the present disclosure, the image of the to-be-picked region is processed through the multi-task perception network. The multi-task perception network can process a plurality of tasks in parallel, and simultaneously extract the image features of the branch 11 and the fruit cluster 12, thereby achieving a higher processing efficiency. The subordinate connection relationship between the fruit cluster 12 and the branch 11 is determined by using the subordinate decision model based on the image features of the fruit cluster 12 and the branch 11, and a branch 11 that does not belong to a picking target is filtered out to determine the to-be-picked fruit cluster 12 and the branch 11 connected to the to-be-picked fruit cluster 12, such that the picking target is determined more accurately. This effectively solves a prior-art problem of a picking failure because a robot recognizes an incorrect branch during fruit bunch picking. In addition, the branch 11 and the fruit cluster 12 are modeled by extracting the key points, which can simplify the model and improve the modeling efficiency while ensuring the simulation effect of the model.

Figure 4:
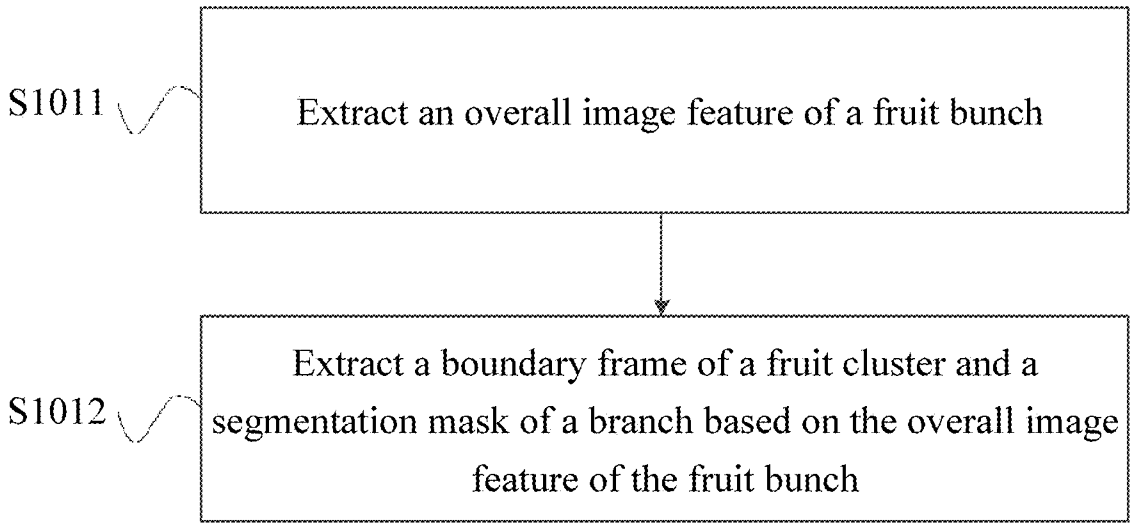
FIG. 4 is a second flowchart of a modeling method for a picking target of a fruit bunch picking robot according to an embodiment of the present disclosure.

Specifically, in some embodiments, as shown in FIG. 4, the extracting image features of each branch and fruit cluster in the image of the to-be-picked region through a multi-task perception network specifically includes following substeps:

Step S1011: Extract an overall image feature of the fruit bunch.

Step S1012: Extract a boundary frame of the fruit cluster and a segmentation mask of the branch based on the overall image feature of the fruit bunch.

In this embodiment, the image of the to-be-picked region is first processed and analyzed to extract an overall image feature of each fruit bunch 1 in the image. The fruit bunch 1 includes the fruit cluster 12 and the branch 11 connected to the fruit cluster 12. It should be noted that these branches 11 usually include a branch 11 actually connected to the fruit cluster 12 and a branch 11 visually connected to the fruit cluster 12 due to overlapping and sheltering of plants.

After an image feature of each fruit brunch 1 in the image is obtained, the multi-task perception network is used to simultaneously perform tasks of extracting the boundary frame of the fruit cluster 12 and extracting the segmentation mask of the branch 11. This can more efficiently segment the image features of the fruit cluster 12 and the branch 11 for further detection and processing.

Specifically, in some embodiments, the multi-task perception network includes: a shared encoder configured to extract the overall image feature of the fruit bunch 1; a target detection decoder communicatively connected to the shared encoder and configured to process the overall image feature of the fruit bunch 1 to extract the boundary frame of the fruit cluster 12; and an instance segmentation decoder communicatively connected to the shared encoder and configured to process the overall image feature of the fruit bunch 1 to extract the segmentation mask of the branch 11.

In this embodiment, the shared encoder is configured to extract the overall image feature of the fruit bunch 1 and transmit the overall image feature of the fruit bunch 1 to the target detection decoder and the instance segmentation decoder. The target detection decoder and the instance segmentation decoder can synchronously recognize and process the overall image feature of the fruit bunch 1 to respectively extract the boundary frame of the fruit cluster 12 and the segmentation mask of the branch 11, thereby achieving the higher processing efficiency.

Specifically, the shared encoder can adopt a backbone network that combines a residual network and a feature pyramid network.

Figure 5:
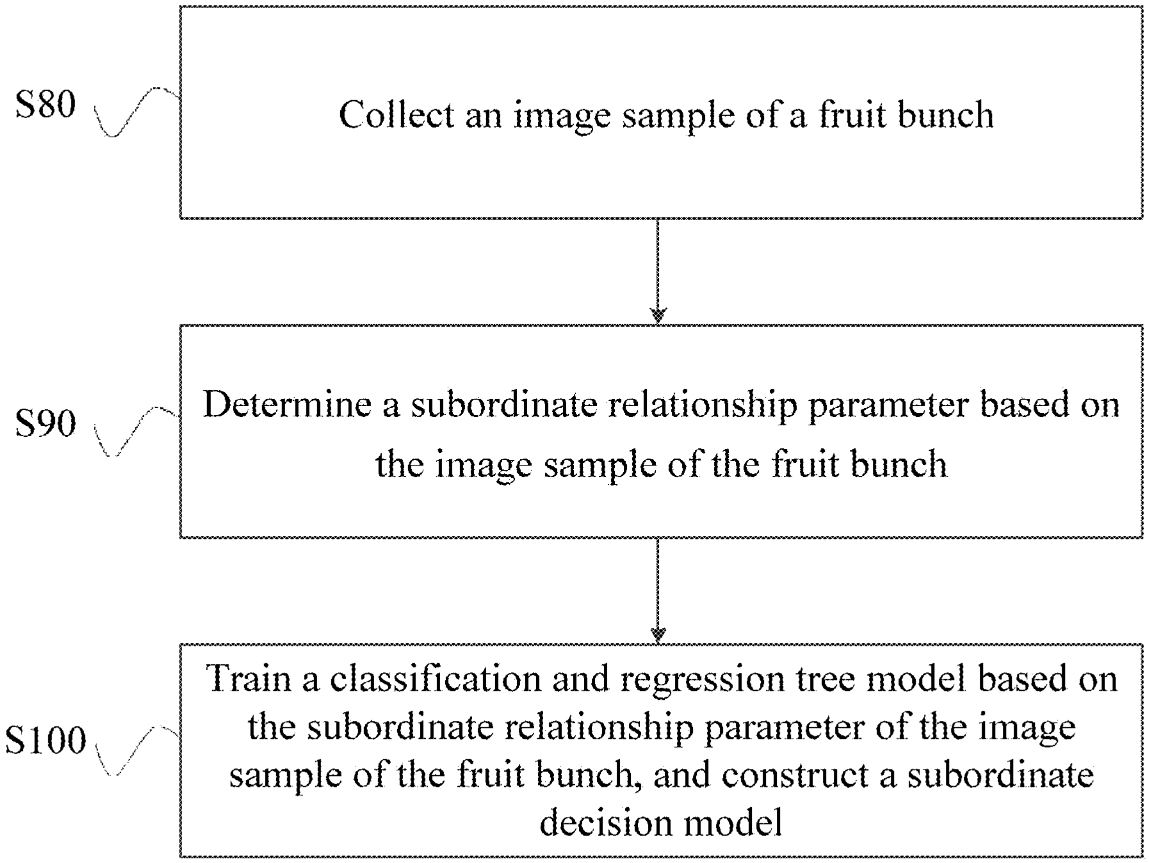
FIG. 5 is a third flowchart of a modeling method for a picking target of a fruit bunch picking robot according to an embodiment of the present disclosure.

In some embodiments, as shown in FIG. 5, before the obtaining an image of a to-be-picked region of a picking robot, and extracting image features of each branch and fruit cluster in the image of the to-be-picked region through a multi-task perception network, the modeling method for a picking target of a fruit bunch picking robot includes following substeps:

Step S80: Collect an image sample of the fruit bunch.

Step S90: Determine a subordinate relationship parameter based on the image sample of the fruit bunch.

Step S100: Train a classification and regression tree model based on the subordinate relationship parameter of the image sample of the fruit bunch, and construct the subordinate decision model.

In this embodiment, before the subordinate decision model is constructed, a certain quantity of image samples of the fruit bunch 1 need to be collected, and the subordinate relationship parameter is extracted based on the image sample. The subordinate relationship parameter is usually related to whether the branch 11 and the fruit cluster 12 are connected, such as a positional relationship between the branch 11 and the fruit cluster 12, or whether contours of the branch 11 and the fruit cluster 12 are connected. After a subordinate relationship parameter in each image sample is extracted, the subordinate connection relationship between the branch 11 and the cluster 12, and a corresponding subordinate relationship parameter are input into the classification and regression tree model for training, to obtain a relationship between the subordinate connection relationship between the branch 11 and the fruit cluster 12, and the corresponding subordinate relationship parameter. Then, the subordinate decision model is constructed to determine the subordinate connection relationship between the branch 11 and the fruit cluster 12 in a complex image.

Specifically, a range and a threshold of each subordinate relationship parameter when the branch 11 and the fruit cluster 12 are connected can be obtained by training the classification and regression tree model.

Figure 6:
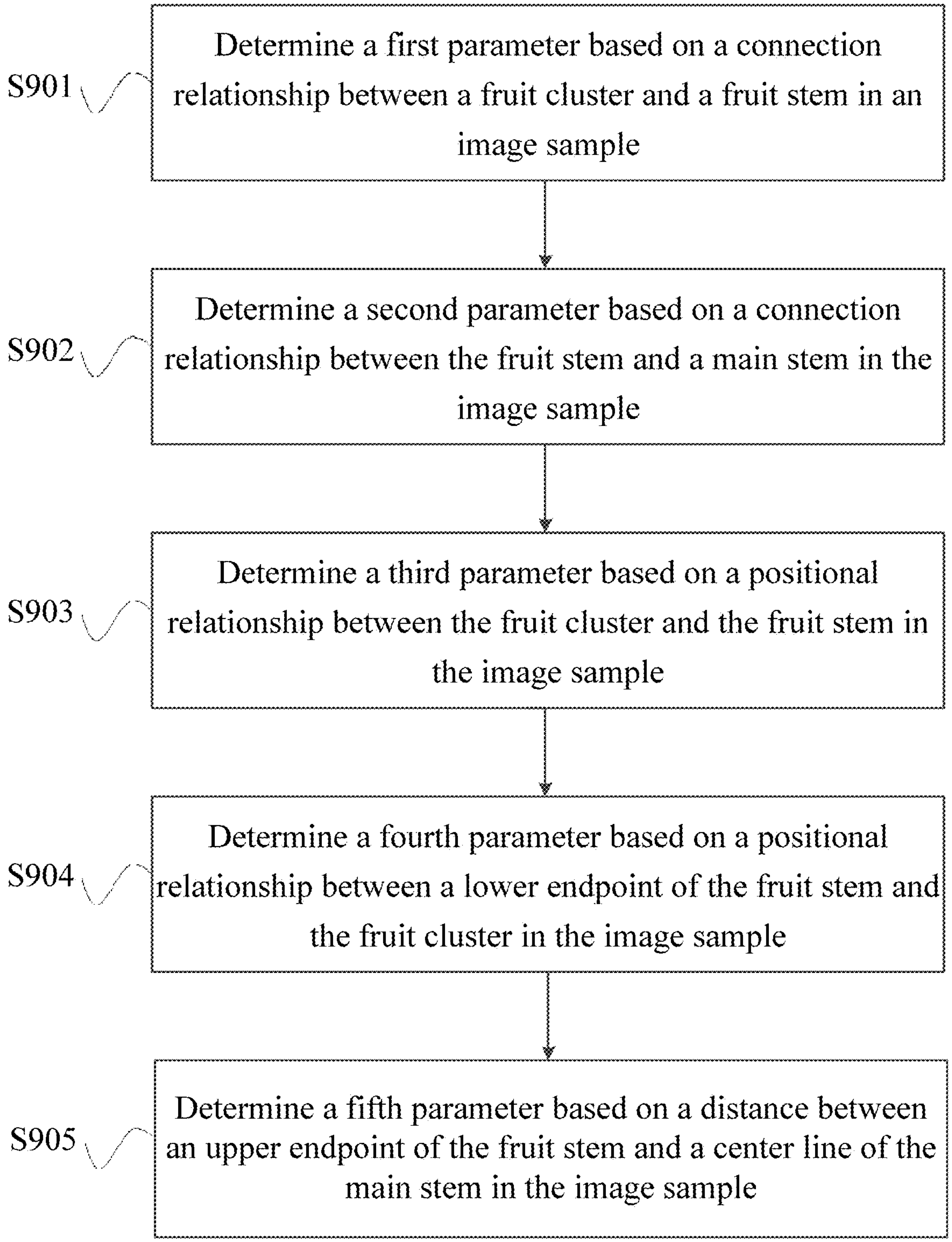
FIG. 6 is a fourth flowchart of a modeling method for a picking target of a fruit bunch picking robot according to an embodiment of the present disclosure.

Specifically, in some embodiments, as shown in FIG. 2 and FIG. 3, the branch 11 includes a main stem 111 and a fruit stem 112. The main stem 111 and the fruit cluster 12 are respectively connected to two ends of the fruit stem 112, and the subordinate relationship parameter includes a first parameter, a second parameter, a third parameter, a fourth parameter, and a fifth parameter. As shown in FIG. 6, the determining a subordinate relationship parameter based on the image sample of the fruit bunch in the step S90 includes following substeps:

Step S901: Determine the first parameter based on a connection relationship between the fruit cluster and the fruit stem in the image sample.

Step S902: Determine the second parameter based on a connection relationship between the fruit stem and the main stem in the image sample.

Step S903: Determine the third parameter based on a positional relationship between the fruit cluster and the fruit stem in the image sample.

Step S904: Determine the fourth parameter based on a positional relationship between a lower endpoint of the fruit stem and the fruit cluster in the image sample.

Step S905: Determine the fifth parameter based on a distance between an upper endpoint of the fruit stem and a center line of the main stem in the image sample.

In this embodiment, the branch 11 is divided into the fruit stem 112 directly connected to the fruit cluster 12 and the main stem 111 supporting the entire fruit bunch 1. The branch 11 is further refined to make the subordinate relationship parameter extracted from the image sample more refined and accurate. In this way, the constructed subordinate decision model is more accurate.

After the image sample is obtained, the connection relationship between the fruit cluster 12 and the fruit stem 112 in the image sample is described using the first parameter. Specifically, the image sample can be processed to obtain the boundary frame of the fruit cluster 12 and a minimum enclosing rectangle of the fruit stem 112. The connection relationship between the fruit cluster 12 and the fruit stem 112 is determined based on a connection relationship between the boundary frame of the fruit cluster 12 and the minimum enclosing rectangle of the fruit stem 112 to obtain the first parameter.

The connection relationship between the fruit stem 112 and the main stem 111 in the image sample is described using the second parameter. Specifically, the image sample can be processed to obtain a minimum enclosing rectangle of the main stem 111 and the minimum enclosing rectangle of the fruit stem 112. The connection relationship between the fruit stem 112 and the main stem 111 is determined based on a connection relationship between the minimum enclosing rectangle of the main stem 111 and the minimum enclosing rectangle of the fruit stem 112 to obtain the second parameter.

The positional relationship between the fruit cluster 12 and the fruit stem 112 in the image sample is described using the third parameter. For example, the image sample can be processed to determine an upper-lower positional relationship between the fruit cluster 12 and the fruit stem 112, so as to obtain the third parameter.

The positional relationship between the lower endpoint of the fruit stem 112 and the fruit cluster 12 in the image sample is described using the fourth parameter. For example, the image sample can be processed, and a Euclidean distance from the lower endpoint of the fruit stem 112 to a midpoint of an upper boundary of the boundary frame of the fruit cluster 12 is calculated to obtain the fourth parameter.

The positional relationship between the upper endpoint of the fruit stem 112 and the center line of the main stem 111 in the image sample is described using the fifth parameter.

The actually connected main stem 111, fruit stem 112, and fruit cluster 12 are also inevitably connected to each other in the image sample. In addition, a positional relationship between the main stem 111, the fruit stem 112, and the fruit cluster 12 is specifically manifested as fluctuations of a positional relationship and a distance between various points within a certain range or threshold, in other words, each subordinate relationship parameter fluctuates within a certain range. The classification and regression tree model is trained based on the subordinate relationship parameter to determine a fluctuation range or threshold of each subordinate relationship parameter when the main stem 111, the fruit stem 112, and the fruit cluster 12 are actually connected, and then the subordinate decision model is constructed. The constructed subordinate decision model can determine a subordinate connection relationship between the corresponding main stem 111, fruit stem 112, and fruit cluster 12 based on a plurality of subordinate relationship parameters, making a determining result more accurate.

In some specific embodiments, after the image sample of the fruit bunch 1 is obtained, the boundary frame of the fruit cluster 12 and segmentation masks of the main stem 111 and the fruit stem 112 can be extracted through the aforementioned multi-task perception network. Based on the segmentation masks of the main stem 111 and the fruit stem 112, centroids and the minimum enclosing rectangles of the main stem 111 and the fruit stem 112 can be calculated using a geometric moment method. In addition, in order to further characterize a contour feature of the fruit stem 112, a least squares polynomial is used to perform curve fitting on the segmentation mask of the fruit stem 112, and extreme points on both sides of a fitted curve are used as a boundary of the fruit stem 112. In this way, the contour feature of the fruit stem 112 is obtained to confirm positions of the upper and lower endpoints of the fruit stem 112. In addition, a center line of the segmentation mask of the main stem 111 is calculated based on a second-order central moment to determine an extension direction of the main stem 111. The above subordinate relationship parameter can be calculated and confirmed based on the obtained boundary frame of the fruit cluster 12, the obtained minimum enclosing rectangles of the fruit stem 112 and the main stem 111, the obtained contour feature of the fruit stem 112, the obtained center line of the main stem 111, and relative positions of the fruit cluster 12, the fruit stem 112 and the main stem 111.

Figure 7:
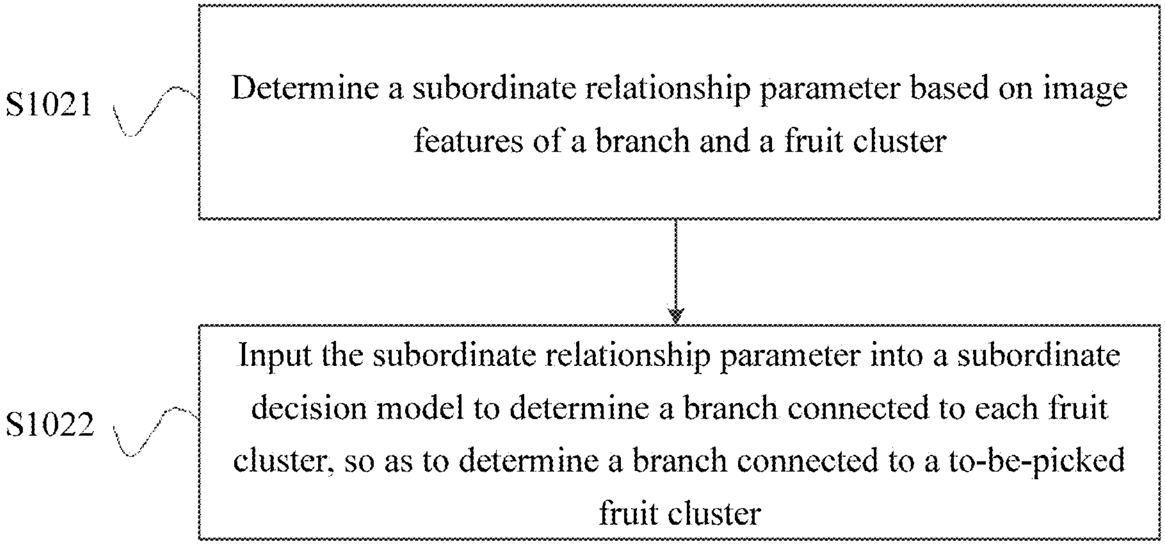
FIG. 7 is a fifth flowchart of a modeling method for a picking target of a fruit bunch picking robot according to an embodiment of the present disclosure.

In some embodiments, as shown in FIG. 7, the inputting the image features of the branch and the fruit cluster into a subordinate decision model to determine a branch connected to the to-be-picked fruit cluster includes following substeps:

Step S1021: Determine the subordinate relationship parameter based on the image features of the branch and the fruit cluster.

Step S1022: Input the subordinate relationship parameter into the subordinate decision model to determine a branch connected to each fruit cluster, so as to determine the branch connected to the to-be-picked fruit cluster.

In this embodiment, after the image features of the branch 11 and the fruit cluster 12 are extracted from the image of the to-be-picked region, the image features of the branch 11 and the fruit cluster 12 can be processed to calculate and determine a corresponding subordinate relationship parameter between different branches 11 and fruit clusters 12. A calculation and determination method is similar to that in the above embodiment and will not be repeated herein. After the subordinate relationship parameter is input into the subordinate decision model, a branch 11 and a fruit cluster 12 that are from a same fruit bunch 1 can be clustered to determine each fruit cluster 12 and a branch 11 connected to the fruit cluster, so as to determine the branch 11 connected to the to-be-picked fruit cluster 12.

Figure 8:
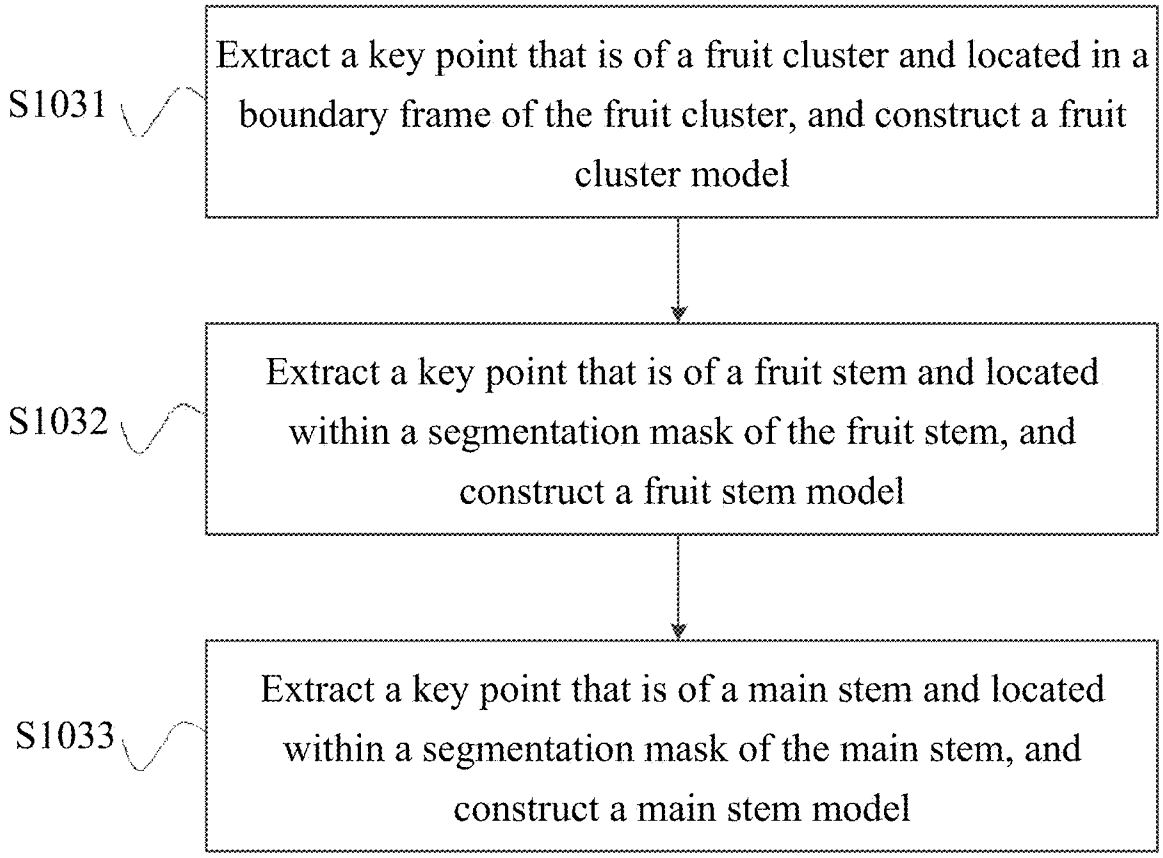
FIG. 8 is a sixth flowchart of a modeling method for a picking target of a fruit bunch picking robot according to an embodiment of the present disclosure.

In some embodiments, as shown in FIG. 2 and FIG. 3, the branch 11 includes the main stem 111 and the fruit stem 112. The main stem 111 and the fruit cluster 12 are respectively connected to the two ends of the fruit stem 112, and the key points include a key point of the fruit cluster, a key point of a fruit stem, and a key point of the main stem. As shown in FIG. 8, the extracting key points of image features of the to-be-picked fruit cluster and the branch connected to the to-be-picked fruit cluster, and modeling the to-be-picked fruit cluster and the branch connected to the to-be-picked fruit cluster in the step S103 includes following substeps:

Step S1031: Extract a key point that is of the fruit cluster and located in the boundary frame of the fruit cluster, and construct a fruit cluster model.

Step S1032: Extract a key point that is of the fruit stem and located within the segmentation mask of the fruit stem, and construct a fruit stem model.

Step S1033: Extract a key point that is of the main stem and located within the segmentation mask of the main stem, and construct a main stem model.

In this embodiment, the fruit cluster model, the fruit stem model, and the main stem model are constructed by extracting the key point of the fruit cluster, the key point of the fruit stem, and the key point of the main stem respectively. In this way, key features (such as a shape, a size, and an extension direction) of the fruit cluster model, the fruit stem model, and the main stem model can be consistent with those of the actual fruit bunch 1, such that the fruit cluster model, the fruit stem model, and the main stem model can accurately simulate an actual key feature, providing a basis for a precise operation of the picking robot. In addition, the fruit bunch 1 is modeled based on the key points, which can also filter out the unnecessary detail, simplify the model, and improve the modeling efficiency.

Specifically, in some embodiments, the key point of the fruit cluster includes all vertices of the boundary frame of the fruit cluster 12.

In this embodiment, the boundary frame of the fruit cluster 12 can be used as a side face of the fruit cluster model by using the vertices of the boundary frame of the fruit cluster 12 as key points of the fruit cluster. In addition, due to a relatively uniform geometric dimension of fruits of a same plant in a maturity period, an average diameter of the fruits can be used as a thickness to construct a cylinder as the fruit cluster model.

Specifically, in some embodiments, the key point of the fruit stem includes a connection point between the fruit stem 112 and the main stem 111, a connection point between the fruit stem 112 and the fruit cluster 12, and an inflection point of a middle segment of the fruit stem 112.

In this embodiment, the connection point between the fruit stem 112 and the main stem 111, and the connection point between the fruit stem 112 and the fruit cluster 12 are used to determine positions of both ends of the fruit stem model, and the inflection point of the middle segment of the fruit stem 112 is used to describe a bending posture of a middle segment of the fruit stem model. A curved cylinder can be constructed as the fruit stem model by combining the key point of the fruit stem and a diameter of the fruit stem 112.

Specifically, in some embodiments, the key point of the main stem includes a first key point and a plurality of second key points. The first key point is the connection point between the fruit stem 112 and the main stem 111. The second key points are spaced on both sides of the first key point along the extension direction of the main stem 111.

In this embodiment, the first key point is used to determine a connection position between the fruit stem model and the main stem model, and the second key point is used to determine the extension direction of the main stem model. A cylinder can be constructed as the main stem model by combining the first key point, the second key point, and a diameter of the main stem 111.

In some specific embodiments, the diameters of the main stem 111 and the fruit stem 112 can be obtained based on a depth image.

In a specific embodiment, as shown in FIG. 3, the key point of the main stem includes a first key point $M_0$ and two second key points $M_1$ and $M_2$ located on both sides of the first key point $M_0$. The two second key points $M_1$ and $M_2$ are located on the main stem and are horizontally 200 pixels away from the first key point $M_0$. The key point of the fruit stem includes the connection point between the fruit stem 112 and the main stem 111 (namely, the first key point $M_0$), a connection point $P_3$ between the fruit stem 112 and the fruit cluster 12, and an inflection point $P_4$ of the middle segment of the fruit stem 112. The $P_4$ is usually a connection point between two segments of the fruit stem 112 and is also usually used as a cutting point of the picking robot during picking. The boundary frame of the fruit cluster 12 is a rectangle, and the key point of the fruit cluster includes four vertices $T_5$, $T_6$, $T_7$, and $T_8$ of the rectangle. For the to-be-picked fruit bunch 1, spatial position information of each key point can be determined based on the above key points in combination with an aligned depth image. Finally, the spatial position information of each key point is input into a prior geometric model pre-trained based on a sample of the fruit bunch 1 to quickly construct a simplified model of the fruit bunch 1.

The following describes a modeling system for a picking target of a fruit bunch picking robot in the present disclosure. The modeling system for a picking target of a fruit bunch picking robot described below and the modeling method for a picking target of a fruit bunch picking robot described above can be cross-referenced.

Figure 9:
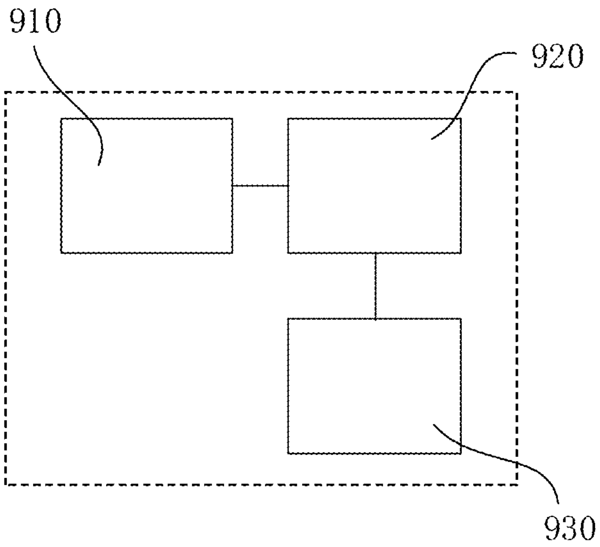
FIG. 9 is a schematic systematic diagram of a modeling system for a picking target of a fruit bunch picking robot according to an embodiment of the present disclosure.

As shown in FIG. 9, the modeling system for a picking target of a fruit bunch picking robot includes: a multi-task perception module 910, a subordinate decision module 920, and a modeling module 930.

The multi-task perception module 910 is configured to extract image features of each branch and fruit cluster in an image of a to-be-picked region through a multi-task perception network. The subordinate decision module 920 is configured to determine a to-be-picked fruit cluster based on the image feature of the fruit cluster, and inputs the image features of the branch and the fruit cluster into a subordinate decision model to determine a branch connected to the to-be-picked fruit cluster. The modeling module 930 is configured to extract key points of image features of the to-be-picked fruit cluster and the branch connected to the to-be-picked fruit cluster, and models the to-be-picked fruit cluster and the branch connected to the to-be-picked fruit cluster.

Figure 10:
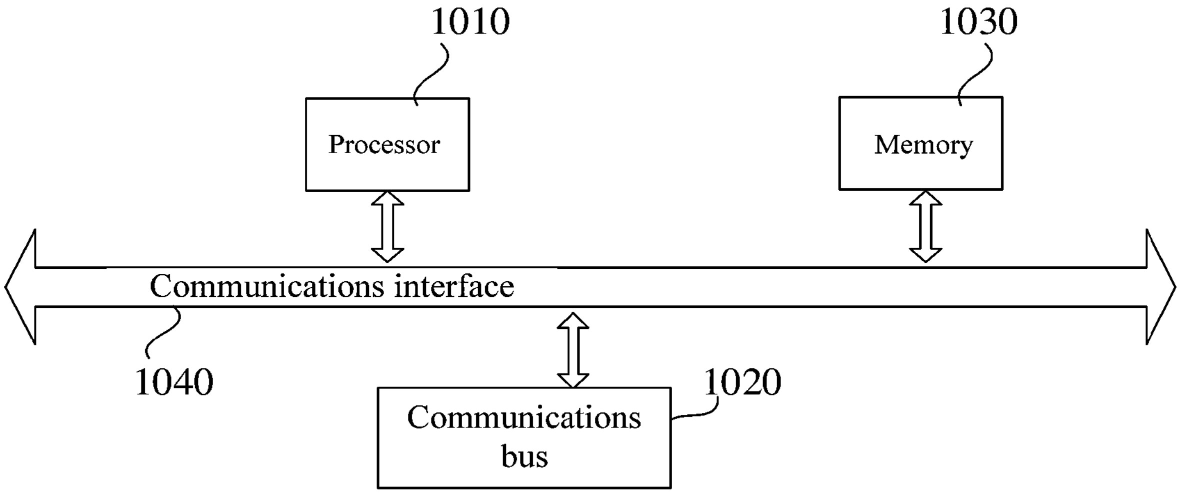
FIG. 10 is a schematic structural diagram of a modeling system for a picking target of a fruit bunch picking robot according to an embodiment of the present disclosure.

FIG. 10 is a schematic structural diagram of an entity of an electronic device. As shown in FIG. 10, the electronic device may include a processor 1010, a communications interface 1020, a memory 1030, and a communications bus 1040. The processor 1010, the communications interface 1020, and the memory 1030 communicate with one another by means of the communications bus 1040. The processor 1010 can call logic instructions in the memory 1030 to execute the modeling method for a picking target of a fruit bunch picking robot in the above embodiments. The method includes: obtaining an image of a to-be-picked region of a picking robot, and extracting image features of each branch and fruit cluster in the image of the to-be-picked region through a multi-task perception network; determining a to-be-picked fruit cluster based on the image feature of the fruit cluster; inputting the image features of the branch and the fruit cluster into a subordinate decision model to determine a branch connected to the to-be-picked fruit cluster; and extracting key points of image features of the to-be-picked fruit cluster and the branch connected to the to-be-picked fruit cluster, and modeling the to-be-picked fruit cluster and the branch connected to the to-be-picked fruit cluster.

Besides, the logic instructions in the memory 1030 may be implemented as a software function unit and be stored in a computer-readable storage medium when sold or used as a separate product. Based on such understanding, the technical solutions of the present disclosure essentially or the part contributing to the prior art or part of the technical solutions may be implemented in a form of a software product. The computer software product may be stored in a storage medium, and includes several instructions for enabling a computer device (which may be a personal computer, a server, a network device, or the like) to perform all or some steps of the method according to each of the embodiments of the present disclosure. The foregoing storage medium includes any medium that can store a program code, such as a universal serial bus (USB) flash disk, a mobile hard disk, a read-only memory (ROM), a random access memory (RAM), a magnetic disk, or an optical disk.

According to another aspect, the present disclosure also provides a computer program product. The computer program product includes a computer program that can be stored on a non-transient computer-readable storage medium. When the computer program is executed by a processor, a computer can execute the modeling method for a picking target of a fruit bunch picking robot provided in the above method embodiments. The method includes: obtaining an image of a to-be-picked region of a picking robot, and extracting image features of each branch and fruit cluster in the image of the to-be-picked region through a multi-task perception network; determining a to-be-picked fruit cluster based on the image feature of the fruit cluster; inputting the image features of the branch and the fruit cluster into a subordinate decision model to determine a branch connected to the to-be-picked fruit cluster; and extracting key points of image features of the to-be-picked fruit cluster and the branch connected to the to-be-picked fruit cluster, and modeling the to-be-picked fruit cluster and the branch connected to the to-be-picked fruit cluster.

According to still another aspect, the present disclosure also provides a non-transient computer-readable storage medium that stores a computer program. The computer program is executed by a processor to execute the modeling method for a picking target of a fruit bunch picking robot provided in the above method embodiments. The method includes: obtaining an image of a to-be-picked region of a picking robot, and extracting image features of each branch and fruit cluster in the image of the to-be-picked region through a multi-task perception network; determining a to-be-picked fruit cluster based on the image feature of the fruit cluster; inputting the image features of the branch and the fruit cluster into a subordinate decision model to determine a branch connected to the to-be-picked fruit cluster; and extracting key points of image features of the to-be-picked fruit cluster and the branch connected to the to-be-picked fruit cluster, and modeling the to-be-picked fruit cluster and the branch connected to the to-be-picked fruit cluster.

The embodiments described above are merely illustrative. Some or all of the modules may be selected according to actual needs to achieve the objectives of the solutions of the embodiments. A person of ordinary skill in the art can understand and implement the embodiments without creative efforts.

Finally, it should be noted that the foregoing embodiments are only used to illustrate the technical solutions of the present disclosure, and are not intended to limit the present disclosure. Although the present disclosure is described in detail with reference to the foregoing embodiments, a person of ordinary skill in the art should understand that he/she can still modify the technical solutions described in the foregoing embodiments, or make equivalent substitutions to some technical features therein. These modifications or substitutions do not make the essence of the corresponding technical solutions depart from the spirit and scope of the technical solutions in the embodiments of the present disclosure.

What is claimed is:

1. A modeling method for a picking target of a fruit bunch picking robot, wherein a fruit bunch comprises a branch and a fruit cluster connected to the branch, and the modeling method for a picking target of a fruit bunch picking robot comprises:

obtaining an image of a to-be-picked region of a picking robot, and extracting image features of each branch and fruit cluster in the image of the to-be-picked region through a multi-task perception network;

determining a to-be-picked fruit cluster based on the image feature of the fruit cluster; and inputting the image features of the branch and the fruit cluster into a subordinate decision model to determine a branch connected to the to-be-picked fruit cluster; and extracting key points of image features of the to-be-picked fruit cluster and the branch connected to the to-be-picked fruit cluster, and modeling the to-be-picked fruit cluster and the branch connected to the to-be-picked fruit cluster;

wherein, before the obtaining an image of a to-be-picked region of a picking robot, and extracting image features of each branch and fruit cluster in the image of the to-be-picked region through a multi-task perception network, the modeling method comprises:

collecting an image sample of the fruit bunch;

determining a subordinate relationship parameter based on the image sample of the fruit bunch; and training a classification and regression tree model based on the subordinate relationship parameter of the image sample of the fruit bunch, and constructing the subordinate decision model;

wherein the branch comprises a main stem and a fruit stem, the main stem and the fruit cluster are respectively connected to two ends of the fruit stem, and the subordinate relationship parameter comprises a first parameter, a second parameter, a third parameter, a fourth parameter, and a fifth parameter; and the determining the subordinate relationship parameter based on the image sample of the fruit bunch comprises:

determining the first parameter based on a connection relationship between the fruit cluster and the fruit stem in the image sample;

determining the second parameter based on the connection relationship between the fruit stem and the main stem in the image sample;

determining the third parameter based on a positional relationship between the fruit cluster and the fruit stem in the image sample;

determining the fourth parameter based on a positional relationship between a lower endpoint of the fruit stem and the fruit cluster in the image sample; and determining the fifth parameter based on a distance between an upper endpoint of the fruit stem and a center line of the main stem in the image sample.

2. The modeling method for a picking target of a fruit bunch picking robot according to claim 1, wherein the extracting image features of each branch and fruit cluster in the image of the to-be-picked region through a multi-task perception network comprises:

extracting an overall image feature of the fruit bunch; and extracting a boundary frame of the fruit cluster and a segmentation mask of the branch based on the overall image feature of the fruit bunch.

3. The modeling method for a picking target of a fruit bunch picking robot according to claim 2, wherein the multi-task perception network comprises:

a shared encoder configured to extract the overall image feature of the fruit bunch;

a target detection decoder communicatively connected to the shared encoder and configured to process the overall image feature of the fruit bunch to extract the boundary frame of the fruit cluster; and an instance segmentation decoder communicatively connected to the shared encoder and configured to process the overall image feature of the fruit bunch to extract the segmentation mask of the branch.

4. The modeling method for a picking target of a fruit bunch picking robot according to claim 2, wherein the branch comprises a main stem and a fruit stem, the main stem and the fruit cluster are respectively connected to two ends of the fruit stem, and the key points comprise a key point of the fruit cluster, a key point of the fruit stem, and a key point of the main stem; and the extracting key points of image features of the to-be-picked fruit cluster and the branch connected to the to-be-picked fruit cluster, and modeling the to-be-picked fruit cluster and the branch connected to the to-be-picked fruit cluster comprises:

extracting a key point that is of the fruit cluster and located in the boundary frame of the fruit cluster, and constructing a fruit cluster model;

extracting a key point that is of the fruit stem and located within a segmentation mask of the fruit stem, and constructing a fruit stem model; and extracting a key point that is of the main stem and located within a segmentation mask of the main stem, and constructing a main stem model.

5. The modeling method for a picking target of a fruit bunch picking robot according to claim 4, wherein the key point of the fruit cluster comprises all vertices of the boundary frame of the fruit cluster.

6. The modeling method for a picking target of a fruit bunch picking robot according to claim 4, wherein the key point of the fruit stem comprises a connection point between the fruit stem and the main stem, a connection point between the fruit stem and the fruit cluster, and an inflection point of a middle segment of the fruit stem.

7. The modeling method for a picking target of a fruit bunch picking robot according to claim 4, wherein the key point of the main stem comprises a first key point and a plurality of second key points, the first key point is a connection point between the fruit stem and the main stem, and the second key points are spaced on both sides of the first key point along an extension direction of the main stem.

8. The modeling method for a picking target of a fruit bunch picking robot according to claim 1, wherein the inputting the image features of the branch and the fruit cluster into a subordinate decision model to determine a branch connected to the to-be-picked fruit cluster comprises:

determining the subordinate relationship parameter based on the image features of the branch and the fruit cluster; and inputting the subordinate relationship parameter into the subordinate decision model to determine a branch connected to each fruit cluster, so as to determine the branch connected to the to-be-picked fruit cluster.

* * * * *